MEANS FOR CONNECTING TWO CENTRALLY LOCATED SWITCHING MEANS HAVING THE SAME FUNCTION
Filed Dec. 29, 1964
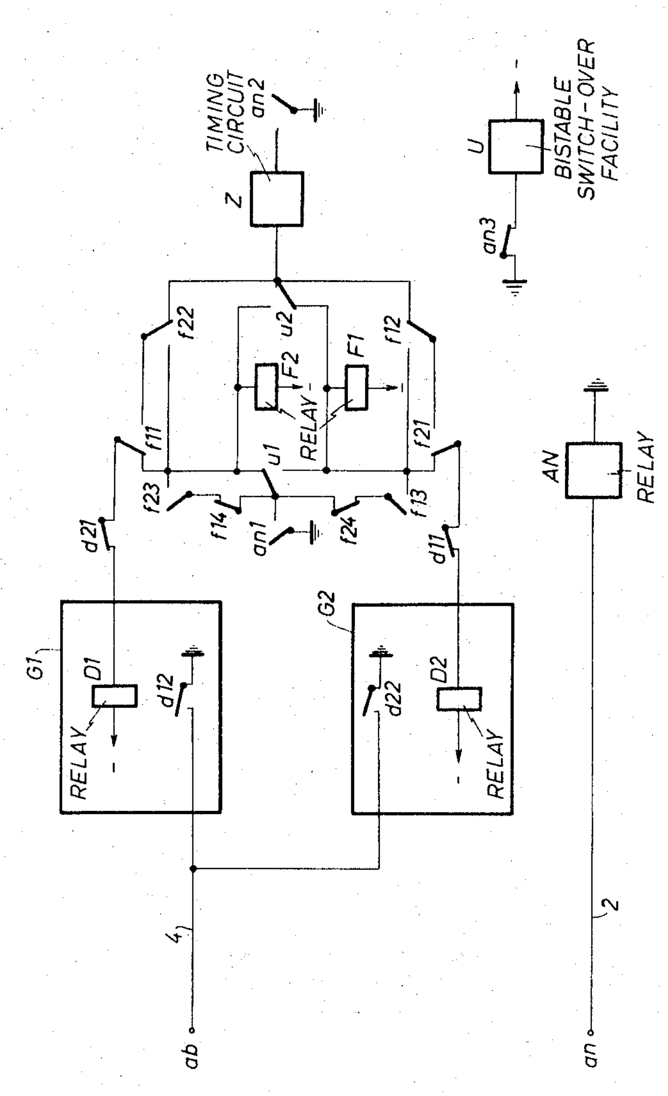

United States Patent Office 3,315,247

Patented Apr. 18, 1967

3,315,247

MEANS FOR CONNECTING TWO CENTRALLY LOCATED SWITCHING MEANS HAVING THE SAME FUNCTION

Walter Hackenberg, Hirschlanden, and Volker Schmidt, Korntal, Germany, assignors to International Standard Electric Corporation, New York, N.Y., a corporation of Delaware Filed Dec. 29, 1964, Ser. No. 421,879

Claims priority, application Germany, Jan. 9, 1964, St 21,530

8 Claims. (Cl. 340—292)

The invention relates to centrally located transmitting-receiving station equipment, to switching means in the equipment, and to the normal operation of successive switches included in the switching means in response to successive signals. It also pertains to the operation of a switch which is operative in the event of failure of one of a pair of switches as well as to the operation of the switch in a switching means having the lowest ordered fault in preference to a switch having a higher ordered fault.

In centrally controlled telephone exchange systems connections within the system can be established through centralized switches. Establishment of a connection is possible then, when within a control group only one centralized switch is operated. If, however, this single switch fails due to troubles of any kind, e.g. by the failure of components or by the blowing of fuses, traffic handling in this control group is interrupted.

Apparatus and methods known for connecting centralized switches heretofore include the use of two such switches per control group in order to minimize, by redundancy, the danger of failure of the entire control group.

The substitution of circuitry is frequently made in such a way that a standby switch is caused to operate only when the standard switch has failed. This kind of standby circuitry can be applied successfully when centralized signalling generators supervise the system, because the standby switch can be easily supervised by operating it without load in a simple way, thereby reducing the danger that the standby facility is also faulty when it is needed.

It is known that the operation of sets of twin switches in control devices such as are represented, for example, by the markers and the translators in telephone exchange systems is not very successful, because the standby switch cannot be checked satisfactorily to assure it will operate when needed.

Other known apparatus and methods provide that two centralized switching means are operated in parallel and the output signals of the switches are compared. This is very expensive and, moreover, the comparing devices cannot find out immediately when a switch is defective and must therefore be switched off. Moreover, such comparing devices in themselves are sources of trouble.

It is, therefore, an object of the invention to provide apparatus for connecting twin-set (or paired) centralized switches or switching means which result in increased safety of operation without a large control of expenditures and in which the possibilities of failure of a control group are minimized.

The apparatus providing connecting twin-set, or pairs of identical centralized switching means or switching facilities according to the invention is characterized in that both switches are requested simultaneously, that in one switch the connection is made immediately and in the other switch the connection is delayed for a certain time, and that, after connection of one switch, the connection of the other one is prevented. If it is further provided that the connecting conditions for both switches are changed after each connecting process to make it always reasonably certain that one switch can take over the operation within the control group. If only one switch is faulty, it is an object of the invention to provide that a faulty switch is switched over to a delayed connection and that the intact switch is always connected immediately. Fault alarm and signalling of the fault is made in a known way through a fault alarm signal. If fault alarm signals appear in both switches, the connecting conditions for both switches are again changed after each connecting process so that nothing is left undone in an effort to meet the requests. A further embodiment of the invention, moreover, provides that when different fault signals in both switches occur the switch with the lower-valued fault is switched to a direct connection and the switch with the higher-valued fault is switched to a delayed connection. This assures that requests can be met with a higher probability of continued performance.

The invention is now explained in detail with the aid of the accompanying drawing, in which the starting means AN is actuated via a signal from "*an*" on the line 2. In response to a signal actuating AN, one of the switching facilities, or (more simply) switches, G1 or G2 should be operated. The connection through G1 or G2 is represented in symbols as being via through-connecting means D1 and D2, which, in the example shown, are relays capable of operating contacts D12 or D22 to place a ground on line 4 to the terminal *ab*. Connection of the requesting switching member with one of the centralized switches is thereby single or multi-wired, depending on the requirements. This is, however, without importance for the essence of the invention so that the exchange of information of both interconnected switches is not considered in detail.

As has been mentioned above, two equal centralized switches are provided for safety reasons and only one takes over operation. These switches are operated alternately. The relay contacts shown in the figure are in their "at rest" positions, or in the positions they occupy before the circuit is energized by a signal on line 2. It should be noted that the capital letter symbols applied to each relay are applied as lower case letters to their corresponding contacts. Using this system of designation, and using numbers as well in otherwise ambiguous cases, leads naturally to relay and contact designations which are related as follows:

Relay AN controls contacts *an*1, *an*2, and *an*3;
Relay D1 controls contacts *d*11 and *d*12;
Relay D2 controls contacts *d*21 and *d*22;
Relay F1 controls contacts *f*11, *f*12, *f*13 and *f*14;
Relay F2 controls contacts *f*21, *f*22, *f*23 and *f*24; and
Relay U controls contacts *u*1 and *u*2.

Assuming that a bistable trigger circuit switching facility U is in the switching condition shown in the drawing, the through-connecting switching means D1 is excited without delay in case of a signal over line 2. Such a signal causes starting means, or relay AN to close the contacts *an*1 and *an*2 and open contact *an*3 of the starting means, or relay AN. The excitation current then passes to D1 via the contact *an*1, *u*1, *f*11, and *d*21. Contact *d*12 is then closed by relay D1 to connect the switching means or switch G1 with the line 4. Further operations are performed in a well-known way, as required by receipt of signals and the configuration of circuits. By opening contact *d*11 relay D1 prevents the operation of the through-connecting means, or relay D2 of the switch G2. After a signal received over line 2 has stopped, the relay AN returns to its original condition, releasing contacts *an*1 and *an*2 and reclosing contact *an*3 to trigger the switch-over facility U. The switch-over facility, or relay U, then moves contacts *u*1 and *u*2 into alternate positions to close contacts opposite to those shown closed in the figure. If a new signal then arrives, the switching means AN responds again. Through contacts *an*1, *u*1, *f*21 and *d*11 the through-connecting means D2 is excited without delay, while the starting circuit for the through-connecting means D1 is delayed through operation of the timing circuit Z over the contacts *an*2, *u*2, *f*11.

After a connection is completed through G2, relay D2 operates contact D21 to disconnect the delayed starting circuit. After the seizing process the starting means AN returns to its original position opening contacts *an*1 and *an*2 and restoring the switch-over device U to its original condition by again closing *an*3. At the next following request, the switch G1 is therefore again set to operation first, since switching devices associated with U have restored *u*1 and *u*2 to their original state.

When a non-delayed through-connection is not successful, the operation is taken over by the second switch, having been started after a delayed through-connection. At that time, a fault alarm signal is applied via the circuit *an*2, Z, *u*2 to a fault alarm switching means F1 or F2, which means thereupon initiates that the switch with the originally non-delayed through-connection is now operated only with a delay. The connection of the switches according to the invention can also be made dependent on internal fault signals of the switches G1 and G2. Assuming that, when switch G1 is faulty, the fault switching means F1 and, at the troubled facility G2, the fault switching means F2 are excited, the twin-set centralized switches are connected as indicated below.

As long as no switch is faulty, the switches G1 and G2 alternately take over operation as already described above. When a switch is faulty, the other non-faulty switch must take over operation without delay. When the fault switching means F1 is excited, a fault has occurred in the switch G1. Switching means F1 operates contact *f*11 to keep the switch G1 connected via the delay circuit Z, independently of the switching condition of the switch-over facility U.

Relay F1 also closes contact *f*13 to connect the through-connecting means D2 with the starting contact *an*1 so that it is actuated without a delay, independently of the switching condition of the switch-over facility U. Under these conditions, the switch G2 immediately takes over operation when a signal is received by relay AN. The conditions are similar when a fault occurs in the switch G2. In such a case, the fault switching means F2 closes contacts *f*21 and *f*23 so that the switch G1 is connected to respond to signals immediately, and the switch G2 is connected to respond with a certain delay.

The faulty condition of the switches may be signified by visible displays (not shown) and a corresponding aural alarm signal may be released.

If the rare case should occur that during such a condition the still intact switch fails the switches are alternately connected with a delay, respectively undelayed like switches still being intact. Thereby, it should be tried in any case through both switches, to determine whether the operation could not be taken over, at least partially. Through the switched-over contacts *f*11 and *f*22 and the contacts *f*12 and *f*21 the starting circuits for the through-connecting means D1 and D2 are again made dependent on the switching position of the switchover device U. The contacts *f*14 and *f*13 thereby prevent the undelayed connection of one of the two switches.

The connection of one of two equal centralized switches according to the invention, explained with the aid of an example is, however, not limited to said example. Many arrangements are possible which are individually determined by the kind of information exchange and the kind of request. An increased safety in operation is, however, reached in any case, when the twin-set centralized switching means are simultaneously requested as the invention provides, however take over the connection undelayed or with a certain delay alternately. By this measure the entire function of the switches is constantly checked without expensive comparing devices and practically always an intact switch for operation is available. Such a connection of centralized switches is of particular advantage with centralized control devices in a telephone exchange system, because these switches can perform a plurality of switching processes and switching decisions which can be supervised in other ways known to the art only with a considerable increase in expenditure.

While the principles of the invention have been described above in connection with specific methods, apparatus and applications, it is to be understood that this description is made only by way of example and not as a limitation on the scope of the invention.

What is claimed is:

1. Switching means for connecting centrally located transmitting-receiving station equipment to a line, comprising:

a start terminal for receiving a requesting signal, a line terminal, a first switch responsive to a requesting signal on said start terminal to complete portions of a plurality of circuits, each of said plurality of circuits including contacts under control of an additional switch, a first additional switch operating without delay upon completion of a first circuit to provide a ground to said line terminal, a timing circuit to provide a time delay, a second additional switch connecting through a second circuit and said timing circuit to operate after a time delay, and means responsive to operation of said first additional switch for preventing response of the second additional switch when the first connection is completed.

2. Switching means for connecting centrally located equipment substantially as claimed in claim 1, in which means are provided to apply the time delay to affect a different circuit on receipt of each succeeding requesting signal.

3. Switching means for connecting centrally located equipment substantially as claimed in claim 1, including means for detecting the defective operation of a switch;

means for switching a defectively operating switch to be operated a delay; and means for switching an intact switch to be operated without a delay.

4. Switching means for connecting centrally located equipment substantially as claimed in claim 3, including means for switching the defective switch permanently so that it can only be actuated following a delay.

5. Switching means for connecting centrally located equipment substantially as claimed in claim 1, in which means are included responsive to faults in two circuits to cause the additional switches to respond alternately to successive requesting signals.

6. Switching means for connecting centrally located duplicate equipment substantially as claimed in claim 1, when both the first and second circuits are faulty, including means for determining which circuit has the lower valued fault;

means for switching the circuit having the lower valued fault to respond to requesting signals without delay; and means for switching the circuit having the higher valued fault to respond to requesting signals following a time delay.

7. Switching means for connecting centrally located transmitting receiving station equipment, comprising:

two centrally located swtiches set to receive requesting signals;

a timing circuit for providing a time delay for operation of one of said switches following receipt of a requesting signal, means coupled to operate a first one of said switches upon receipt of a requesting signal;

means coupled through said timing circuit to operate a second one of said switches following a time delay after receipt of a requesting signal; and means responsive to operation of said first switch to inhibit action by said second switch.

8. Switching means substantially as claimed in claim 7, including:

means for connecting the time delay to apply to alternate ones of said switches upon receipt of successive requesting signals.

References Cited by the Examiner

UNITED STATES PATENTS

| | | | |
|---|---|---|---|
| 2,936,442 | 5/1960 | Christman et al. | 340—147 |

| | | | |
|---|---|---|---|
| 2,994,860 | 8/1961 | Weld | 340—292 |
| 3,072,748 | 1/1963 | Abraham | 325—2 |

FOREIGN PATENTS

| | | |
|---|---|---|
| 966,990 | 9/1957 | Germany. |

NEIL C. READ, *Primary Examiner.*

A. H. WARING, *Assistant Examiner.*